(12) United States Patent
Rozenfeld

(10) Patent No.: US 12,287,864 B2
(45) Date of Patent: Apr. 29, 2025

(54) LOGIN METHODOLOGY

(71) Applicant: Nathan Rozenfeld, Davie, FL (US)

(72) Inventor: Nathan Rozenfeld, Davie, FL (US)

(*) Notice: Subject to any disclaimer, the term of this patent is extended or adjusted under 35 U.S.C. 154(b) by 0 days.

(21) Appl. No.: 18/231,131

(22) Filed: Aug. 7, 2023

(65) Prior Publication Data

US 2024/0184878 A1 Jun. 6, 2024

Related U.S. Application Data

(63) Continuation of application No. 14/854,079, filed on Sep. 15, 2015, now Pat. No. 11,720,663.

(60) Provisional application No. 62/050,233, filed on Sep. 15, 2014.

(51) Int. Cl.
*G06F 21/45* (2013.01)
*G06F 21/36* (2013.01)

(52) U.S. Cl.
CPC .............. *G06F 21/45* (2013.01); *G06F 21/36* (2013.01)

(58) Field of Classification Search
CPC .......... G06F 21/31; G06F 21/32; G06F 21/45; G06F 21/36; H04L 63/08; H04L 63/083; H04L 63/0861
See application file for complete search history.

(56) References Cited

U.S. PATENT DOCUMENTS

| | | | |
|---|---|---|---|
| 9,019,583 B2 * | 4/2015 | Wu | H04N 1/04 358/537 |
| 9,112,868 B2 * | 8/2015 | Takakura | H04L 67/10 |
| 9,398,269 B2 * | 7/2016 | Mizobe | G16H 40/67 |
| 9,674,269 B2 * | 6/2017 | Takakura | H04L 67/10 |
| 10,944,730 B1 * | 3/2021 | Boutros | H04L 63/06 |
| 11,558,192 B2 * | 1/2023 | Auh | H04L 9/0836 |
| 11,652,818 B2 * | 5/2023 | Zheng | H04L 63/0876 726/5 |
| 11,720,663 B2 * | 8/2023 | Rozenfeld | G06F 21/45 726/6 |

* cited by examiner

*Primary Examiner* — Hosuk Song
(74) *Attorney, Agent, or Firm* — Bonini IP Law, LLC; Frank J. Bonini, Jr.

(57) ABSTRACT

Methods and apparatus to a login methodology. A method includes selecting a library of images stored in the computer device, setting nicknames for the selected library, uploading the selected library of images to the server, and generating a login account. A network includes a server including at least a processor and a memory, a computer device linked to the server, the computer device including at least a processor and a memory, the memory including at least an operating system and a login process, the login process including selecting a library of images stored in the computer device, setting nicknames for the selected library, uploading the selected library of images to the server and generating a login account.

18 Claims, 5 Drawing Sheets

300

Select a library of images
310

Set nicknames
320

Upload the selected
library of images to
a server
330

Generate a login
account
340

LOGIN METHODOLOGY

CROSS REFERENCE TO RELATED APPLICATIONS

This application claims priority to U.S. application Ser. No. 14/854,079, filed on Sep. 15, 2015, and U.S. Provisional Application Ser. No. 62/050,233, filed on Sep. 15, 2014, both of which are entitled "Login Methodology," the entire contents of both which are hereby incorporated by reference.

BACKGROUND OF THE INVENTION

The present invention generally relates to computer security, and more specifically to a login methodology.

In general, experts advise computer users of all types, such as laptops, tablets and smartphones, to create strong usernames and passwords to protect valuable information when creating an account in their computers and online (e.g., Web applications). With the rise of computer crimes such as identity theft, it is wise to take the necessary steps to ensure that important information is protected.

However, it is often difficult for users to create unique usernames and passwords and remember them. More often than not, users default to adopting usernames and passwords that are easy to crack by individuals and groups seeking to capitalize on personal data of another.

What is needed is a simple and secure method of replacing traditional usernames and password to insure data security and integrity.

SUMMARY OF THE INVENTION

The following presents a simplified summary of the innovation described herein. This summary is not an extensive overview of the invention. It is intended to neither identify key nor critical elements of the invention nor delineate the scope of the invention. Its sole purpose is to present some concepts of the invention in a simplified form as a prelude to the more detailed description that is presented later.

The present invention generally relates to computer security, and more specifically to a login methodology.

In one aspect, the invention features a method including selecting a library of images stored in the computer device, setting nicknames for the selected library, uploading the selected library of images to the server, and generating a login account.

In another aspect, the invention features a network including a server including at least a processor and a memory, a computer device linked to the server, the computer device including at least a processor and a memory, the memory including at least an operating system and a login process, the login process including selecting a library of images stored in the computer device, setting nicknames for the selected library, uploading the selected library of images to the server and generating a login account.

Embodiments may have one or more of the following advantages.

The process eliminates a need to remember usernames and passwords.

Passwords consisting of a sequence of images cannot be hacked or stolen simply by accessing a database or server responsible for password management.

The process enables an ability to provide login setting and verification as a service to other Software as a Service (SaaS) companies.

The process eliminates a need to store meaningful content that identifies a username and/or password.

The process is easy to use and the same login credentials can be used in multiple places.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The features and advantages of the invention are apparent from the following description taken in conjunction with the accompanying drawings in which:

FIG. 2 is a flow diagram.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, and so forth, described in one embodiment may also be included in other embodiments, but is not necessarily included. Thus, the present technology can include a variety of combinations and/or integrations of the embodiments described herein.

The present invention is directed to a login methodology. More specifically, the methods of the present invention replace a traditional username and password with one or more symbolic/graphic representations. Using the methods described herein, end users are provided with an easy to adopt and operate login methodology.

The present invention enables an ability to eliminate a need for a user to enter a username and password in the conventional manner of the past and provides a number of benefits for consumers and companies. For example, using the login methodology of the present invention, companies can outsource this method as a service to an external agency. Using the login methodology of the present invention, a username name and password is no longer to a specific set of characters and/or numerals. No longer is there a need for a user to remember multiple sets of usernames/passwords that can be easily stolen or compromised.

The login methodology of the present invention empowers end users to take control of how they set up their login credentials in an easy to adopt method and makes login credentials nearly impossible to crack.

Figure 1:
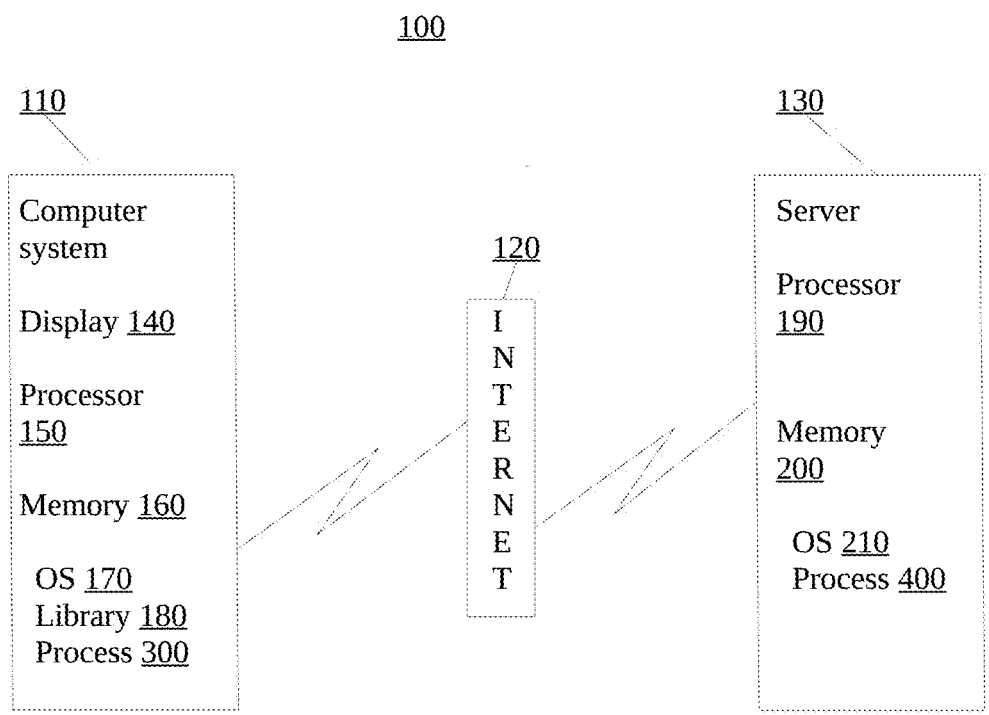
FIG. 1 is a block diagram of an exemplary network.

As shown in FIG. 1, an exemplary network 100 includes a computer device 110 linked to a network of interconnected computers (e.g., Internet) 120. A server 130 is linked to the Internet 120.

The computer device 110 includes at least a display 140, a processor 150 and a memory 160. The memory 160 includes at least an operating system (OS) 170, such as Windows® or Linux®, a library 180 of images and a login process 300. The server 130 includes at least a processor 190 and a memory 200. The memory includes at least an operating system 210 and a process 400 that receives a username and password.

Figure 3:
FIG. 3 illustrates an exemplary local library of images.

As shown in FIG. 2, the login process 300 includes selecting (310) a library of images. Referring to FIG. 3, an exemplary library of images 500 is shown, where the library 500 includes a set of electronic files of various image formats, such as, for example, JPEG, BMP, PNG, and so forth. Each of the electronic files contain images, graphics, drawings or other graphical content. In a preferred embodiment, the library 500 includes twenty to thirty files.

Figure 4:
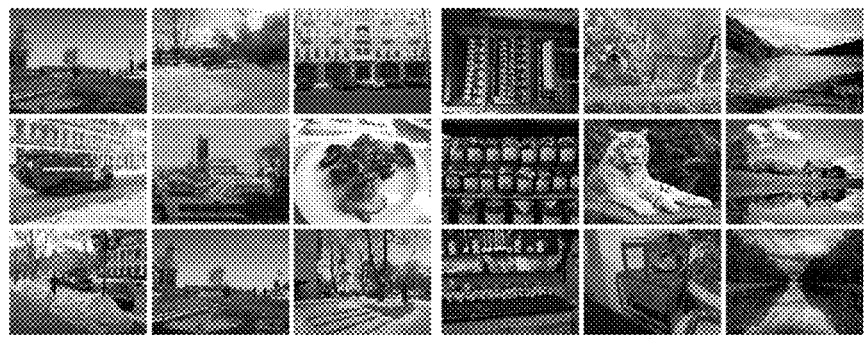
FIG. 4 illustrates an exemplary selection and assignment of a hint to an image file.
Figure 4:
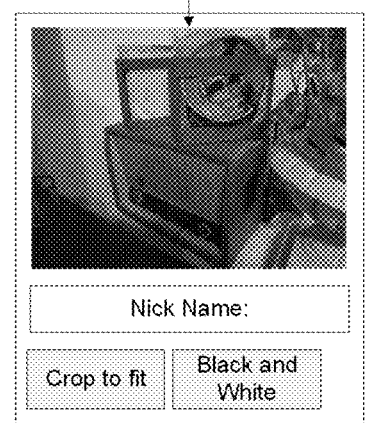

Referring back to FIG. 2, the login process 300 includes setting (320) nicknames (sometimes referred to as hints) for the selected group of files. Referring to FIG. 4, each selected file is assigned (or named) a nickname. Each nickname is used as a hint to a user. The hint represents a dual purpose of an ability to obfuscate a true meaning of the file content and provide a hint to a sequence of the file within a series of files used to validate the user.

Referring back to FIG. 2, the login process 300 uploads (330) the selected library of images to a server. This is sometimes referred to as storing images to the cloud. The stored images can be changed or modified by the user as many times as needed.

The login process 300 generates (340) a login account. Generating (340) the login account includes generating a username that does not contain text. Rather, the username is one of the files selected from the library of images stored on the server. After a username is generated, a Globally Unique Identifier (GUID) for the selected image file generated and stored remotely only. In one example, a nickname "user face" refers to an image file representing the username.

Generating (340) the login account then generates a password. Here again, the generated password does not contain text, rather, the password is set as a series of files put together by the user in a particular sequence and the number of files chosen by the user represents a level of complexity it holds.

Figure 5:
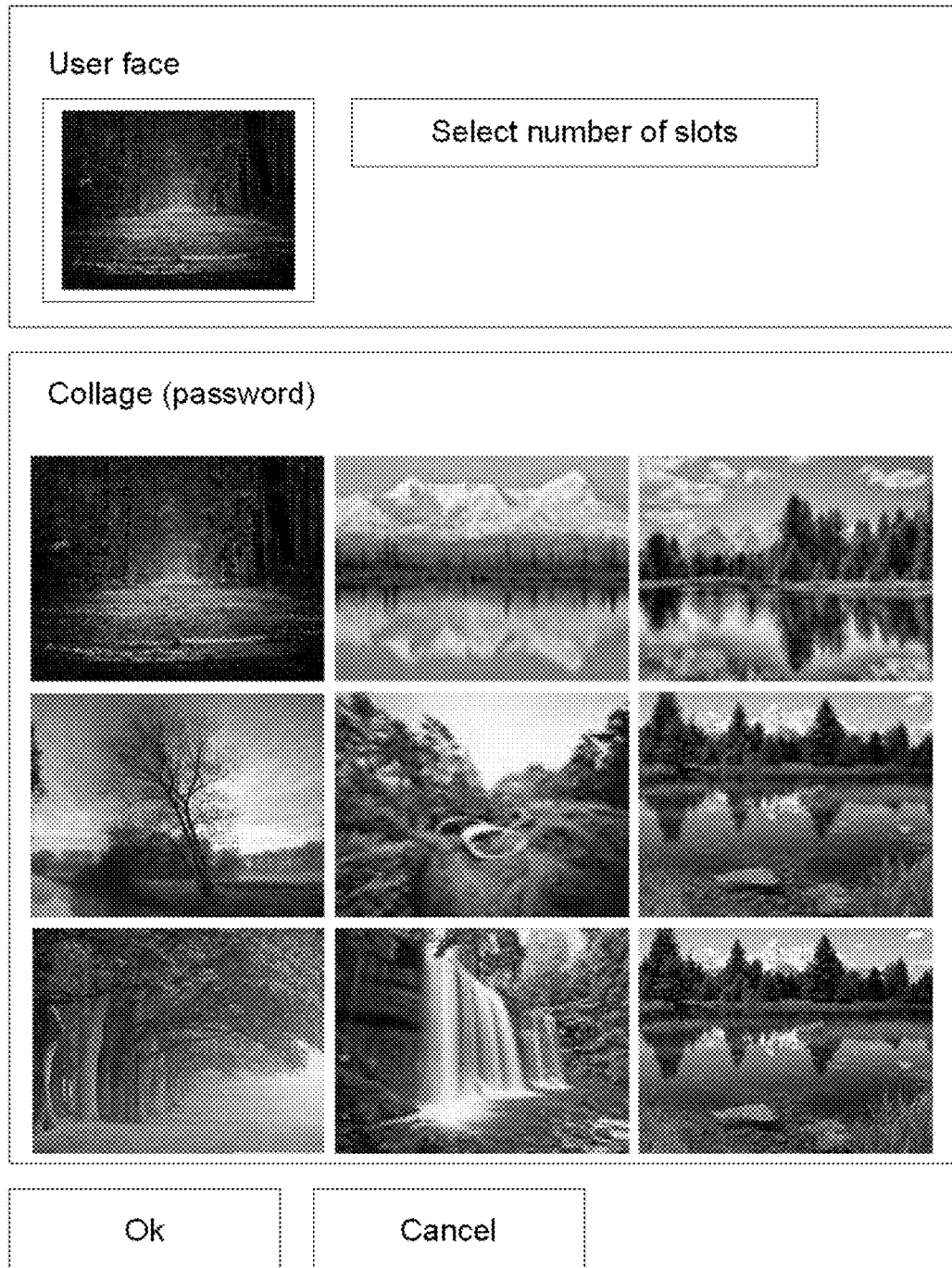
FIG. 5 illustrates an exemplary generation of a username and password.

For example, in one embodiment, the user can select a level complexity from a minimum of four to a maximum of twelve. Each image in a selected series is equipped with a nickname that the user can use as a hint for correctly selecting an image and its sequence. A nickname is entered as text that describes the image in an obfuscated manner to make sure only the user is able to identify the sequence. FIG. 5 illustrates selection of nine images that make up an exemplary password, referred to here as a password:collage.

As the user completes image selection process for a password, the images are stored in the server. Each time the set of images is presented to the user a new GUID is created and deployed with each image. On every new login, a new set of GUIDs is generated. The GUIDs are used to compile the password <ID-Key-String>. The same string is sent to the server and used to verify the correct password:collage is selected.

In order to provide an additional layer of protection and complexity for password:collage, the process uses a feature referred to as "missing:cell". Some of the images required to generate the correct password:collage are omitted. An image stating "missing" is injected into the total selection pool of images. As a user selects their images they are able to place the "missing" graphic in the correct location to replace the needed image. The server knows which images were omitted from the selection pull and anticipates the "missing" in the correct location. A unique <ID-Key-String> is also set for the "missing" image.

Figure 6:
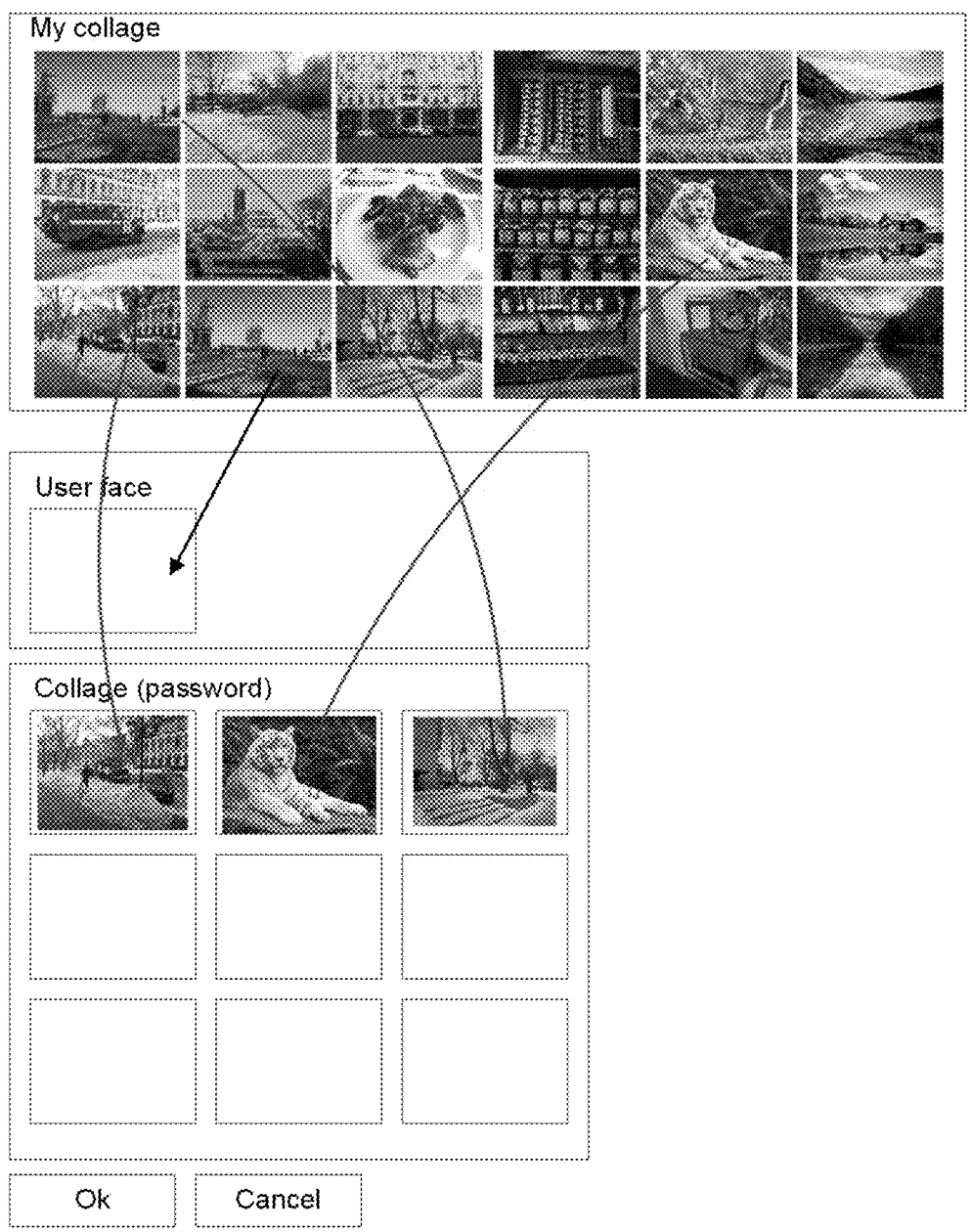
FIG. 6 illustrates an exemplary login.

As shown in FIG. 6, a username name need no longer be secret. A user simply selects one of the images files to be used as a username. Upon a selection of all the necessary files placed in the proper sequence the content of the files is combined, compressed, encrypted and sent to the server for processing. The server decrypts, uncompresses and separates the content into individual files. The actual files and their sequence are validated by the server. If the validation is successful, a pass is returned to the user. If the validation is unsuccessful, the user is given a change to reselect the series and the sequence of files. After a predetermined number of attempts, the account is locked and must be reset.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices, magnetic disks, e.g., internal hard disks or removable disks, magneto optical disks, and CD ROM and DVD-ROM disks. The processor and the memory can be supplemented by, or incorporated in special purpose logic circuitry.

While the invention has been described with reference to exemplary embodiments, it will be understood by those skilled in the art that various changes may be made and equivalents may be substituted for elements thereof without departing from the scope of the invention. Accordingly, any apparently limiting statements are made only with regard to a particular embodiment, and are not limiting of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising: in a network of interconnected computer systems, the network of interconnected computer systems comprising at least multiple computers, including a first computer device, and at least one computer device comprising a server, in the first computer device, selecting a library of one or more files or file portions of non-textual formats stored in the first computer device; in the first computer device, setting nicknames for the selected library; in the first computer device, uploading the selected library of one or more files or file portions of non-textual formats to the at least one computer device comprising the server; and in the first or any subsequent computer device, generating a login account;

wherein generating the login account comprises: generating an account name that does not contain text; generating a Globally Unique Identifier (GUID) for the selected one or more files or file portions of non-textual formats file generated and stored remotely; and generating a password that does not contain text; and wherein the password that does not contain text includes one or more one or more files or file portions of non-textual formats, and wherein the first computer device communicates the one or more files or file portions of non-textual formats to the server for verification of a login to the login account, and wherein the communicated one or more files or file portions of non-textual formats include at least one omitted portion thereof, and wherein the server knowing the at least one omitted portion thereof, anticipates the omitted portion and identifies the missing portion of the one or more files or file portions of non-textual formats and generates a unique <ID-Key-String>, and wherein for each new login by the first computer device, generating a new Globally Unique Identifier (GUID) for the selected one or more files or file portions of non-textual formats generated and stored remotely.

2. The method of claim 1 wherein the library of one or more files or file portions of non-textual formats stored in the first computer device comprise a set of electronic files of a plurality of image formats.

3. The method of claim 2 wherein the image formats include one or more of a JPEG format, a BMP and a PNG format.

4. The method of claim 2 wherein the electronic files comprises one or more of images, graphics, drawings and other graphical content.

5. The method of claim 2 wherein the set of electronic files includes twenty to thirty files.

6. The method of claim 1 wherein each nickname is used as a hint to the first computer device.

7. The method of claim 1 wherein the first computer device comprises a server.

8. The method of claim 7 wherein the account name is one of the files selected from the library of one or more files or file portions of non-textual formats stored on the at least one computer device comprising a server and the password is set as a series of non-textual format files put together by the first computer device in a particular sequence.

9. The method of claim 8 wherein the one or more files or file portions of non-textual formats of the said one or more files or file portions of non-textual formats selection process for a password are stored in the at least one computer device comprising a server.

10. A network of interconnected computer systems comprising: multiple computers, including at least one of said multiple computers comprising a server having at least a processor and a memory; at least one of said multiple computers comprising a first computer device linked to the server, the at least one first computer device having at least a processor and a memory, the memory comprising at least an operating system and a login process, the login process comprising:

selecting a library of one or more files or file portions of non-textual formats stored in the at least one first computer device; setting nicknames for the selected library; uploading the selected library of one or more files or file portions of non-textual formats to the at least one of said multiple computers comprising a server; and generating a login account;

wherein generating the login account comprises: generating an account name that does not contain text; generating a Globally Unique Identifier (GUID) for the selected one or more files or file portions of non-textual formats file generated and stored remotely; and generating a password that does not contain text; and wherein the password that does not contain text includes one or more one or more files or file portions of non-textual formats, and wherein the first computer device communicates the one or more files or file portions of non-textual formats to the server for verification of a login to the login account, and wherein the communicated one or more files or file portions of non-textual formats include at least one omitted portion thereof, and wherein the server knowing the at least one omitted portion thereof, anticipates the omitted portion and identifies the missing portion of the one or more files or file portions of non-textual formats and generates a unique <ID-Key-String>, and wherein for each new login by the first computer device, generating a new Globally Unique Identifier (GUID) for the selected one or more files or file portions of non-textual formats generated and stored remotely.

11. The network of claim 10 wherein the library of one or more files or file portions of non-textual formats stored in the first computer device comprise a set of electronic files of a plurality of image formats.

12. The network of claim 11 wherein the image formats include one or more of a JPEG format, a BMP and a PNG format.

13. The network of claim 11 wherein the electronic files comprises one or more of images, graphics, drawings and other graphical content.

14. The network of claim 11 wherein the set of electronic files includes twenty to thirty files.

15. The network of claim 10 wherein each nickname is used as a hint to the first computer device.

16. The network of claim 10 wherein the first computer device comprises a server.

17. The network of claim 16 wherein the account name is one of the files selected from the library of one or more files or file portions of non-textual formats stored on the at least one computer device comprising a server and the password is set as a series of non-textual format files put together by the first computer device in a particular sequence.

18. The network of claim 17 wherein the one or more files or file portions of non-textual formats of image selection process for a password are stored in the at least one computer device comprising a server.

* * * * *